US012626904B2

(12) United States Patent
Han et al.

(10) Patent No.: US 12,626,904 B2
(45) Date of Patent: May 12, 2026

(54) LITHIUM SECONDARY BATTERY

(71) Applicant: LG Energy Solution, Ltd., Seoul (KR)

(72) Inventors: Jun Hyeok Han, Daejeon (KR); Chul Haeng Lee, Daejeon (KR); Kyoung Ho Ahn, Daejeon (KR); Young Ho Oh, Daejeon (KR); You Kyeong Jeong, Daejeon (KR); Yoon Seok Ko, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/097,310

(22) Filed: Apr. 1, 2025

(65) Prior Publication Data

US 2025/0233124 A1      Jul. 17, 2025

Related U.S. Application Data

(63) Continuation of application No. 18/386,651, filed on Nov. 3, 2023.

(30) Foreign Application Priority Data

Nov. 4, 2022      (KR) ........................ 10-2022-0146438

(51) Int. Cl.
*H01M 10/0525*     (2010.01)
*H01M 4/136*       (2010.01)
*H01M 4/1397*      (2010.01)
*H01M 10/0569*     (2010.01)
*H01M 4/02*        (2006.01)

(52) U.S. Cl.
CPC ......... *H01M 4/136* (2013.01); *H01M 4/1397* (2013.01); *H01M 10/0525* (2013.01); *H01M 10/0569* (2013.01); *H01M 2004/028* (2013.01)

(58) Field of Classification Search
CPC ............... H01M 4/136; H01M 4/1397; H01M 2004/028
See application file for complete search history.

(56) References Cited

U.S. PATENT DOCUMENTS

| | | | |
|---|---|---|---|
| 2002/0034678 A1 | 3/2002 | Shibuya et al. | |
| 2007/0166617 A1* | 7/2007 | Gozdz ................. | H01M 4/5825 |
| | | | 429/231.95 |
| 2011/0037019 A1 | 2/2011 | Nakano et al. | |
| 2011/0223476 A1 | 9/2011 | Kobayashi et al. | |
| 2012/0244425 A1* | 9/2012 | Tokuda ............. | H01M 10/0564 |
| | | | 429/188 |
| 2013/0209865 A1 | 8/2013 | Kim et al. | |
| 2013/0224598 A1 | 8/2013 | Kameda et al. | |
| 2013/0230781 A1 | 9/2013 | Yu et al. | |
| 2013/0295468 A1 | 11/2013 | Yu et al. | |
| 2015/0086878 A1 | 3/2015 | Yu et al. | |
| 2015/0288032 A1 | 10/2015 | Choi et al. | |
| 2018/0233738 A1 | 8/2018 | Jung et al. | |
| 2018/0277900 A1 | 9/2018 | Abe et al. | |
| 2018/0337408 A1* | 11/2018 | Mok ................... | H01M 4/0404 |
| 2018/0342758 A1 | 11/2018 | Tang et al. | |
| 2019/0260031 A1 | 8/2019 | Kim et al. | |
| 2020/0259209 A1 | 8/2020 | Park et al. | |
| 2020/0303774 A1 | 9/2020 | Shi et al. | |
| 2022/0320498 A1 | 10/2022 | Kapylou et al. | |
| 2023/0135194 A1 | 5/2023 | Kim et al. | |
| 2023/0170480 A1 | 6/2023 | Kim et al. | |
| 2024/0186508 A1 | 6/2024 | Nam et al. | |

FOREIGN PATENT DOCUMENTS

| | | |
|---|---|---|
| CN | 102792491 A | 11/2012 |
| CN | 103688402 A | 3/2014 |
| CN | 114243089 A | 3/2022 |
| CN | 114421093 A | 4/2022 |
| JP | 2001325988 A | 11/2001 |
| JP | 2007250415 A | 9/2007 |
| JP | 2007294323 A | 11/2007 |
| JP | 2008192391 A | 8/2008 |
| JP | 2009099523 A | 5/2009 |
| JP | 2011187410 A | 9/2011 |
| JP | 2012094505 A | 5/2012 |
| JP | 2014191942 A | 10/2014 |
| JP | 2015534225 A | 11/2015 |
| JP | 2018537815 A | 12/2018 |
| JP | 6751158 B2 | 9/2020 |
| JP | 2021190330 A | 12/2021 |
| JP | 2022159208 A | 10/2022 |
| JP | 2023520194 A | 5/2023 |
| KR | 20110005809 A | 1/2011 |
| KR | 20120136312 A | 12/2012 |
| KR | 20130009706 A | 1/2013 |
| KR | 101513086 B1 | 4/2015 |
| KR | 20160076192 A | 6/2016 |

(Continued)

OTHER PUBLICATIONS

International Search Report for PCT/KR2023/017580 mailed Feb. 8, 2024, pp. 1-9. [see pp. 8-9, categorizing the cited references].

(Continued)

*Primary Examiner* — Osei K Amponsah

(74) *Attorney, Agent, or Firm* — Lerner David LLP

(57)      ABSTRACT

Provided is a lithium secondary battery including a positive electrode, a negative electrode, a separator, and a non-aqueous electrolyte, wherein the positive electrode includes a positive electrode active material comprising lithium iron phosphate particles, and the positive electrode has a loading amount of 450 mg/25 cm$^2$ to 740 mg/25 cm$^2$, and the non-aqueous electrolyte includes a lithium salt, an organic solvent, and an additive, wherein the organic solvent includes ethylene carbonate, and dimethyl carbonate, and the dimethyl carbonate is included in 5 vol % to 75 vol % in the organic solvent, and the additive contains vinylene carbonate, and the weight ratio of the vinylene carbonate to the dimethyl carbonate is greater than 0 to 0.2 or less.

19 Claims, No Drawings

(56)         References Cited

FOREIGN PATENT DOCUMENTS

| | | | |
|---|---|---|---|
| KR | 20190101518 | A | 9/2019 |
| KR | 20200098335 | A | 8/2020 |
| KR | 20210088770 | A | 7/2021 |
| KR | 20210152267 | A | 12/2021 |
| KR | 20220094628 | A | 7/2022 |
| WO | 2017057588 | A1 | 4/2017 |
| WO | 2022177242 | A1 | 8/2022 |
| WO | 2022211507 | A1 | 10/2022 |

OTHER PUBLICATIONS

Search Report dated Sep. 17, 2025 from the Office Action for Chinese Application No. 202380074710.6 issued Sep. 20, 2025, 2 pages.
Extended European Search Report including Written Opinion for Application No. 23886395.5 dated Feb. 10, 2026. 7 pgs.

* cited by examiner

LITHIUM SECONDARY BATTERY

CROSS-REFERENCE TO RELATED APPLICATIONS

This application is a continuation application of U.S. application Ser. No. 18/386,651 filed on Nov. 3, 2023, which claims priority from Korean Patent Application No. 10-2022-0146438 filed on Nov. 4, 2022, both the disclosures of which are incorporated herein by reference.

BACKGROUND OF THE INVENTION

Field of the Invention

The present disclosure relates to a lithium secondary battery.

Description of the Related Art

As personal IT devices and computer networks have been developed due to the development of an information society and the society's reliance on electric energy is increased overall, there is a need for the development of a technology for efficiently storing and utilizing electric energy.

A secondary battery is a technology most suitable for various uses among developed technologies, and among these secondary batteries, there is a growing interest in a lithium secondary battery, which can be made small enough to be applied to personal IT devices and the like, and also, has the highest energy density.

In general, a lithium secondary battery is manufactured by injecting or impregnating a non-aqueous electrolyte into an electrode assembly composed of a positive electrode, a negative electrode, and a porous separator.

A carbon-based active material, a silicon-based active material, or the like is considered as a negative electrode active material of the lithium secondary battery. Meanwhile, the use of a lithium-containing cobalt oxide, $LiMnO_2$ of a layered crystal structure, $LiMn_2O_4$ of a spinel crystal structure, a lithium-containing nickel oxide ($LiNiO_2$), or the like is being considered as a positive electrode active material.

Recently, the use of a lithium iron phosphate (e.g., $LiFePO_4$)-based active material, which has excellent thermal stability and is relatively inexpensive, has been considered as a positive electrode active material.

However, the lithium iron phosphate-based active material has a lower specific capacity than lithium cobalt oxide, lithium nickel oxide, and the like, so that in order to increase the energy density of a positive electrode and a lithium secondary battery including the same, the lithium iron phosphate-based active material should be used in a high loading amount, but a high-loading lithium iron phosphate positive electrode has a problem in that it is difficult for a non-aqueous electrolyte to be sufficiently impregnated into the positive electrode, so that there is a problem in that it is difficult to express capacity, resistance is increased, and lifespan is degraded.

BRIEF SUMMARY

An aspect of the present invention provides a lithium secondary battery including lithium iron phosphate particles as a positive electrode active material, and a positive electrode having a specific loading amount or greater, wherein the lithium secondary battery has an excellent capacity expression effect, excellent lifespan performance, and a resistance reduction effect by improving negative electrode reduction stability while improving impregnation properties of the positive electrode with respect to the non-aqueous electrolyte.

According to an aspect of the present invention, there is provided a lithium secondary battery including a positive electrode, a negative electrode, a separator, and a non-aqueous electrolyte, wherein the positive electrode includes a positive electrode active material, wherein the positive electrode active material includes lithium iron phosphate particles, and the positive electrode has a loading amount of 450 mg/25 cm$^2$ to 740 mg/25 cm$^2$, the non-aqueous electrolyte includes a lithium salt, an organic solvent, and an additive, wherein the organic solvent includes a cyclic carbonate-based solvent and a linear carbonate-based solvent, wherein the cyclic carbonate-based solvent contains ethylene carbonate, and the linear carbonate-based solvent contains dimethyl carbonate, and the dimethyl carbonate is included in 5 vol % to 75 vol % in the organic solvent, and the additive contains vinylene carbonate, and the ratio of the weight of the vinylene carbonate to the weight of the dimethyl carbonate is greater than 0 to 0.2 or less.

DETAILED DESCRIPTION

First, before describing the present invention, it will be understood that terms or words used in the present specification and claims shall not be construed as being limited to having meanings defined in commonly used dictionaries, but should be interpreted as having meanings and concepts consistent with the technical idea of the present invention based on the principle that an inventor may appropriately define concepts of the terms to best explain the invention.

Meanwhile, the terms used herein are only used to describe exemplary embodiments, and are not intended to limit the present invention. Singular expressions include plural expressions unless the context clearly indicates otherwise.

It will be further understood that the terms "include," "comprise," or "have" when used in the present specification, specify the presence of stated features, numbers, steps, elements, or combinations thereof, but do not preclude the presence or addition of one or more other features, numbers, steps, elements, or combinations thereof.

In the present specification, "%" means wt % unless otherwise noted.

Before describing the present invention, it will be understood that in the description of "carbon atoms a to b" herein, "a" and "b" refer to the number of carbon atoms included in a specific functional group. That is, the functional group may include "a" to "b" number of carbon atoms.

In addition, in the present specification, unless otherwise defined, "substituted" means that at least one hydrogen bonded to carbon is substituted with an element other than hydrogen, and for example, it means being substituted with an alkyl group having 1 to 5 carbon atoms or a fluorine element.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a sub-micron region to several millimeters, so that results of high reproducibility and high resolution may be obtained.

Hereinafter, the present invention will be described in more detail.

Lithium Secondary Battery

The present disclosure relates to a lithium secondary battery.

Specifically, the lithium secondary battery according to the present disclosure includes a positive electrode, a negative electrode, a separator, and a non-aqueous electrolyte, wherein the positive electrode includes a positive electrode active material, wherein the positive electrode active material includes lithium iron phosphate particles, and the positive electrode has a loading amount of 450 mg/25 cm$^2$ to 740 mg/25 cm$^2$, and wherein the non-aqueous electrolyte includes a lithium salt, an organic solvent, and an additive, wherein the organic solvent includes a cyclic carbonate-based solvent and a linear carbonate-based solvent, wherein the cyclic carbonate-based solvent contains ethylene carbonate, and the linear carbonate-based solvent contains dimethyl carbonate, and the dimethyl carbonate is included in 5 vol % to 75 vol % in the organic solvent, and the additive contains vinylene carbonate, and the ratio of the weight of the vinylene carbonate to the weight of the dimethyl carbonate is greater than 0 to 0.2 or less.

The lithium secondary battery according to the present disclosure is characterized by including a positive electrode which has a specific loading amount or greater and includes lithium iron phosphate particles as a positive electrode active material, and a non-aqueous electrolyte which includes ethylene carbonate and dimethyl carbonate as an organic solvent, and includes vinylene carbonate as an additive, wherein the content and content ratio of each of the dimethyl carbonate and the vinylene carbonate are adjusted to be in a specific range. According to the lithium secondary battery of the present disclosure, dimethyl carbonate is used as an organic solvent component to improve the electrolyte impregnation properties of a positive electrode having a high loading amount, and at the same time, vinylene carbonate additive is used to have a specific content ratio in relation to dimethyl carbonate to improve negative electrode reduction stability, so that the capacity of the lithium secondary battery may be expressed at an excellent level, and the lifespan performance and resistance properties may be improved.

The lithium secondary battery according to the present disclosure, may have a capacity retention rate of 90% or greater, preferably 90% to 95% at the 200$^{th}$ cycle; and a resistance increase rate of 20% or less, preferably 15% or less at the 200$^{th}$ cycle, while maintaining a cell design capacity of at least 500 mAh, more specifically at least 550 mAh, and an initial discharge capacity of at least 500 mAh, more specifically at least 540 mAh, provided by the positive electrode comprising lithium iron phosphate particle as the active material and having a loading amount of 450 mg/25 cm$^2$ to 740 mg/25 cm$^2$, only when the electrolyte contained comprises an organic solvent comprising ethylene carbonate and dimethyl carbonate, and an additive comprising vinylene carbonate, wherein the dimethyl carbonate is included in 5 vol % to 75 vol % in the organic solvent, and a weight ratio of the vinylene carbonate to the dimethyl carbonate is greater than 0 to 0.2 or less. The cell design capacity, initial discharge capacity, capacity retention rate and resistance increase rate are measured according to the methods described in the examples below.

The lithium secondary battery includes a positive electrode, a negative electrode, a separator, and a non-aqueous electrolyte. Specifically, the lithium secondary battery includes a positive electrode, a negative electrode opposing the positive electrode, a separator interposed between the positive electrode and the negative electrode, and a non-aqueous electrolyte.

The lithium secondary battery may be manufactured by preparing an electrode assembly comprising a positive electrode, a negative electrode, and a separator; accommodating the electrode assembly in a battery case; preparing a non-aqueous electrolyte comprising a lithium salt, an organic solvent, and an additive; injecting or impregnating the non-aqueous electrolyte prepared into the battery case.

(1) Positive Electrode

The positive electrode includes a positive electrode active material. The positive electrode active material includes lithium iron phosphate particles.

The lithium iron phosphate particles may include a compound represented by Formula A below.

$$Li_{1+a}Fe_{1-s}M_s(PO_{4-b})X_b \hspace{2cm} \text{[Formula A]}$$

In Formula A above, M is one or more elements selected from the group consisting of Co, Ni, Mn, Al, Mg, Ti, and V, and X is F, S, or N, wherein $0 \leq s \leq 0.5$, $-0.5 \leq a \leq +0.5$, and $0 \leq b \leq 0.1$.

Formula A above may be specifically represented by LiFePO$_4$ (a=0, s=0, and b=0).

The lithium iron phosphate particles may be in the form of a primary particle, or may be in the form of a secondary particle in which two or more primary particles are aggregated. Specifically, the lithium iron phosphate particles may be in the form of a primary particle.

The lithium iron phosphate particles may be composed of primary particles, may be composed of secondary particles in which two or more primary particles are aggregated, or may be a mixture of primary particles and secondary particles in which two or more primary particles are aggregated.

At this time, when the lithium iron phosphate particles are in the form of a primary particle, the average particle diameter (D$_{50}$) of the lithium iron phosphate particles may be 0.2 μm to 3.0 μm, specifically 0.2 μm to 2.0 μm, and more specifically 0.3 μm to 1.5 μm. In addition, when the lithium iron phosphate particles are in the form of a secondary particle in which two or more primary particles are aggregated, the primary particles may have an average particle diameter (D$_{50}$) of 0.2 μm to 3.0 μm, specifically 0.2 μm to 2.0 μm, and more specifically 0.3 μm to 1.5 μm, and the secondary particles may have an average particle diameter (D$_{50}$) of 7 μm to 25 μm, and specifically 10 μm to 20 μm.

The positive electrode active material may further include a carbon coating layer positioned on a surface of the lithium iron phosphate particles. The carbon coating layer may be introduced for the purpose of protecting the lithium iron phosphate particles, improving electrical conductivity, and the like.

The positive electrode active material may not include lithium nickel-based oxide, for example, lithium nickel-cobalt-manganese oxide, or lithium nickel-cobalt-aluminum oxide. In the case of a positive electrode including the lithium nickel-based oxide, it may be difficult to exert the effect even if a loading amount (450 mg/25 cm$^2$ or greater) and a non-aqueous electrolyte to be described later are applied.

The loading amount of the positive electrode may be 450 mg/25 cm$^2$ to 740 mg/25 cm$^2$.

Compared to other positive electrode active materials such as lithium cobalt oxide and lithium nickel-cobalt-manganese oxide, the lithium iron phosphate particles have an advantage of being excellent in thermal stability and relatively inexpensive, but has a problem in that the loading amount should be increased to implement high energy density due to the small specific capacity thereof. When the loading amount of the positive electrode is increased (e.g., 450 mg/25 cm$^2$ to 740 mg/25 cm$^2$), it is possible to implement a high energy density battery (for example, a lithium secondary battery having a cell design capacity of at least 500 mAh, more specifically at least 550 mAh, and an initial discharge capacity of at least 500 mAh, more specifically at least 540 mAh), but it is difficult for a non-aqueous electrolyte to be sufficiently impregnated into the positive electrode, so that there is a problem in that it is difficult to express the capacity of the lithium secondary battery, the resistance is increased, and the lifespan performance is degraded.

In order to solve such a problem, the lithium secondary battery according to the present disclosure uses a non-aqueous electrolyte including dimethyl carbonate as an organic solvent component, and uses vinylene carbonate as an additive, wherein the content and content ratio thereof are adjusted to be in a specific range. Through this feature, it is possible to improve the electrolyte impregnation properties of a positive electrode having a loading amount of 450 mg/25 cm$^2$ to 740 mg/25 cm$^2$, and at the same time, improve negative electrode reduction stability, so that the capacity of a lithium secondary battery may be expressed at an excellent level, and the lifespan performance and the resistance properties may be improved.

When the loading amount of the positive electrode is less than 450 mg/25 cm$^2$, the above-described problem of degradation in electrolyte impregnation properties does not arise, so that the effect according to the use of the non-aqueous electrolyte according to the present disclosure is not expressed.

Meanwhile, if the loading amount of the positive electrode is greater than 740 mg/25 cm$^2$, there is a possibility in that electrolyte impregnation properties may not be sufficiently secured even if the non-aqueous electrolyte according to the present disclosure is applied to the positive electrode containing lithium iron phosphate particles. In addition, when the loading amount of the positive electrode is greater than 740 mg/25 cm$^2$, for example, when lithium iron phosphate particles having a small average particle diameter ($D_{50}$) are applied to a positive electrode, the size of pores formed between the lithium iron phosphate particles is small, and in this case, a slurry solvent evaporates from the pores formed between the lithium iron phosphate particles during a drying process when manufacturing the positive electrode, which may cause the positive electrode to crack, so that it may be difficult to manufacture or implement the positive electrode.

Specifically, the loading amount of the positive electrode may be 450 mg/25 cm$^2$ to 740 mg/25 cm$^2$, 450 mg/25 cm$^2$ to 730 mg/25 cm$^2$, 450 mg/25 cm$^2$ to 720 mg/25 cm$^2$, 450 mg/25 cm$^2$ to 710 mg/25 cm$^2$, or 450 mg/25 cm$^2$ to 700 mg/25 cm$^2$, and more specifically 500 mg/25 cm$^2$ to 680 mg/25 cm$^2$, 500 mg/25 cm$^2$ to 650 mg/25 cm$^2$, 500 mg/25 cm$^2$ to 625 mg/25 cm$^2$, or 500 mg/25 cm$^2$ to 600 mg/25 cm$^2$.

The positive electrode may include a positive electrode current collector, and a positive electrode active material layer disposed on at least one surface of the positive electrode current collector. At this time, the positive electrode active material layer may include the above-described positive electrode active material.

The positive electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, or the like, an aluminum-cadmium alloy, or the like may be used as the positive electrode current collector.

The positive electrode current collector may typically have a thickness of 3 μm to 500 μm.

The positive electrode current collector may have microscopic irregularities formed on the surface thereof to improve the adhesion of the positive electrode active material. For example, the positive electrode current collector may be used in various forms such as a film, a sheet, a foil, a net, a porous body, a foam, and a non-woven body.

The positive electrode active material layer is disposed on at least one surface of the positive electrode current collector. Specifically, the positive electrode active material layer may be disposed on one surface or both surfaces of the positive electrode current collector.

The positive electrode active material may be included in an amount of 80 wt % to 99 wt % in the positive electrode active material layer in consideration of exerting sufficient capacity of the positive electrode active material.

The positive electrode active material layer may further include a binder and/or a conductive material together with the positive electrode active material described above.

The binder is a component for assisting in binding of an active material, a conductive material, and the like, and binding to a current collector, and specifically, may include at least one of a polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, or fluorine rubber, preferably polyvinylidene fluoride.

The binder may be included in the positive electrode active material layer in an amount of 1 wt % to 20 wt %, preferably 1.2 wt % to 10 wt %, in terms of securing sufficient binding force between components such as a positive electrode active material.

The conductive material may be used to assist and improve conductivity in the secondary battery, and is not particularly limited as long as it has conductivity without causing a chemical change. Specifically, the positive electrode conductive material may include graphite such as natural graphite and artificial graphite; a carbon-based material such as carbon black, acetylene black, KETJEN-BLACK®, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; and a polyphenylene derivative, and may preferably include carbon black in terms of improving conductivity.

In terms of securing sufficient electrical conductivity, the conductive material may be included in the positive electrode active material layer in an amount of 1 wt % to 20 wt %, preferably 1.2 wt % to 10 wt %.

The thickness of the positive electrode active material layer may be 100 μm to 300 μm, preferably 150 μm to 250 μm.

The positive electrode may be manufactured by coating a positive electrode slurry including a positive electrode active material, and selectively, a binder, a conductive material, and a solvent for forming a positive electrode slurry on the positive electrode current collector, followed by drying and roll-pressing.

The solvent for forming a positive electrode slurry may include an organic solvent such as N-methyl-2-pyrrolidone (NMP). The solid content of the positive electrode slurry may be 40 wt % to 90 wt %, specifically 50 wt % to 80 wt %.

(2) Negative Electrode

The negative electrode may oppose the positive electrode.

The negative electrode includes a negative electrode active material.

The negative electrode may include a negative electrode current collector, and a negative electrode active material layer disposed on at least one surface of the negative electrode current collector. At this time, the negative electrode active material may be included in the negative electrode active material layer.

The negative electrode current collector is not particularly limited as long as it has conductivity without causing a chemical change in the battery. Specifically, copper, stainless steel, aluminum, nickel, titanium, fired carbon, copper or stainless steel that is surface-treated with one of carbon, nickel, titanium, silver, or the like, an aluminum-cadmium alloy, or the like may be used as the negative electrode current collector.

The negative electrode current collector may typically have a thickness of 3 μm to 500 μm.

The negative electrode current collector may have microscopic irregularities formed on the surface thereof to improve the adhesion of the negative electrode active material. For example, the negative electrode current collector may be used in various forms such as a film, a sheet, a foil, a net, a porous body, a foam, and a non-woven body.

The negative electrode active material layer is disposed on at least one surface of the negative electrode current collector. Specifically, the negative electrode active material layer may be disposed on one surface or both surfaces of the negative electrode current collector.

The negative electrode active material layer may include a negative electrode active material.

The negative electrode active material is a material capable of reversibly intercalating/de-intercalating lithium ions, and may include at least one of a carbon-based active material, a (semi-)metal-based active material, or a lithium metal, and specifically, may include at least one of a carbon-based active material or a (semi-)metal-based active material.

The carbon-based active material may include at least one of graphite, hard carbon, soft carbon, carbon black, graphene, or fibrous carbon, and preferably, may include graphite. The graphite may include at least one of natural graphite or artificial graphite.

The average particle diameter ($D_{50}$) of the carbon-based active material may be 10 μm to 30 μm, preferably 15 μm to 25 μm, in terms of ensuring structural stability during charge/discharge and decreasing side reactions with an electrolyte solution.

Specifically, the (semi-)metal-based active material may include at least one (semi-)metal of Cu, Ni, Na, K, Rb, Cs, Fr, Be, Mg, Ca, Sr, Si, Sb, Pb, In, Zn, Ba, Ra, Ge, Al, V, Ti, or Sn, an alloy of lithium and at least one (semi-)metal of Cu, Ni, Na, K, Rb, Cs, Fr, Be, Mg, Ca, Sr, Si, Sb, Pb, In, Zn, Ba, Ra, Ge, Al, V, Ti, or Sn, an oxide of at least one (semi-)metal of Cu, Ni, Na, K, Rb, Cs, Fr, Be, Mg, Ca, Sr, Si, Sb, Pb, In, Zn, Ba, Ra, Ge, Al, V, Ti, or Sn, lithium titanium oxide (LTO), lithium vanadium oxide, or the like.

More specifically, the (semi-)metal-based active material may include a silicon-based active material.

The silicon-based active material may include a compound represented by $SiO_x$ ($0 \leq x < 2$). Since $SiO_2$ does not react with lithium ions, thereby not being able to store lithium, it is preferable that x is in the above range, and more preferably, the silicon-based active material may be SiO.

The average particle diameter ($D_{50}$) of the silicon-based active material may be 1 μm to 30 μm, preferably 2 μm to 15 μm, in terms of ensuring structural stability during charge/discharge and decreasing side reactions with an electrolyte solution.

The negative electrode active material may be included in an amount of 60 wt % to 99 wt %, preferably 75 wt to 95 wt % in the negative electrode active material layer.

The negative electrode active material layer may further include a binder and/or a conductive material together with the negative electrode active material.

At this time, the binder is used to improve battery performance by improving adhesion between the negative electrode active material layer and the negative electrode current collector, and may include, for example, at least any one of polyvinylidenefluoride-hexafluoropropylene copolymer (PVDF-co-HFP), polyvinylidenefluoride (PVDF), polyacrylonitrile, polymethylmethacrylate, polyvinylalcohol, carboxymethylcellulose (CMC), starch, hydroxypropylcellulose, regenerated cellulose, polyvinylpyrrolidone, polytetrafluoroethylene, polyethylene, polypropylene, polyacrylic acid, ethylene-propylene-diene monomer (EPDM), sulfonated EPDM, styrene butadiene rubber (SBR), fluorine rubber, or a material having a hydrogen thereof substituted with Li, Na, Ca, or the like, and may also include various copolymers thereof.

The binder may be included in an amount of 0.5 wt % to 10 wt %, preferably 1 wt % to 5 wt %, in the negative electrode active material layer.

The conductive material is not particularly limited as long as it has conductivity without causing a chemical change in the battery, and for example, graphite such as natural graphite and artificial graphite; a carbon-based material such as carbon black, acetylene black, KETJEN BLACK®, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used.

The conductive material may be included in an amount of 0.5 wt % to 10 wt %, preferably 1 wt % to 5 wt %, in the negative electrode active material layer.

The thickness of the negative electrode active material layer may be 50 μm to 300 μm, preferably 100 μm to 200 μm.

The loading amount of the negative electrode active material layer may be 200 mg/25 cm² to 500 mg/25 cm², preferably 250 mg/25 cm² to 400 mg/25 cm².

The negative electrode may be manufactured by coating a negative electrode slurry including a negative electrode active material, a binder, a conductive material, and/or a solvent for forming a negative electrode slurry on at least one surface of a negative electrode current collector, followed by drying and roll-pressing.

The solvent for forming a negative electrode slurry may include, for example, at least one of distilled water, N-methyl-2-pyrrolidone (NMP), ethanol, methanol, or isopropyl alcohol, preferably distilled water, in terms of facilitating the dispersion of the negative electrode active material, the binder, and/or the conductive material. The solid content of the negative electrode slurry may be 30 wt % to 80 wt %, specifically 40 wt % to 70 wt %.

(3) Separator

The separator may be interposed between the positive electrode and negative electrode.

As the separator, a common porous polymer film typically used as a separator, for example, a porous polymer film made of a polyolefin-based polymer, such as an ethylene homocopolymer, a propylene homocopolymer, an ethylene/butene copolymer, an ethylene/hexene copolymer, and an ethylene/methacrylate copolymer may be used alone, or a laminate thereof may be used. Alternatively, a common porous non-woven fabric, for example, a non-woven fabric made of glass fiber having a high melting point or polyethylene terephthalate fiber may be used, but the present disclosure is not limited thereto. Also, a coated separator including a ceramic component or a polymer material may be used to secure heat resistance or mechanical strength, and may be selectively used in a single-layered or a multi-layered structure.

(4) Non-Aqueous Electrolyte

1) Lithium Salt

First, the lithium salt will be described as follows.

In the non-aqueous electrolyte solution for a lithium secondary battery according to an embodiment of the present invention, any lithium salt may be used as the lithium salt without particular limitation as long as it is typically used in an electrolyte solution for a lithium secondary battery, and for example, the lithium salt may include $Li^+$ as a cation, and may include at least one of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-(CF_3)_6P^-CF_3SO_3^-$, $C_4F_9SO_3^-$, $CF_3CF_2SO_3^-$, $(CF_3SO_2)_2N^-(FSO_2)_2N^-CF_3CF_2$ $(CF_3)_2CO^-(CF_3SO_2)_2CH^-CH_3SO_3^-$, $CF_3$ $(CF_2)_7SO_3^-$, $CF_3CO_2^-$, $CH_3CO_2^-$, $SCN^-$, or $(CF_3CF_2SO_2)_2N^-$ as an anion. Specifically, the lithium salt may be at least one selected from the group consisting of LiCl, LiBr, LiI, LiBF$_4$, LiClO$_4$, LiAlO$_4$, LiAlCl$_4$, LiPF$_6$, LiSbF$_6$, LiAsF$_6$, LiBioCl$_{10}$, LiBOB (LiB(C$_2$O$_4$)$_2$), LiCF$_3$SO$_3$, LiTFSI (LiN(SO$_2$CF$_3$)$_2$), LiFSI (LiN(SO$_2$F)$_2$), LiCH$_3$SO$_3$, LiCF$_3$CO$_2$, LiCH$_3$CO$_2$, and LiBETI (LiN(SO$_2$CF$_2$CF$_3$)$_2$). Specifically, the lithium salt may include a single material of LiBF$_4$, LiClO$_4$, LiPF$_6$, LiBOB (LiB (C$_2$O$_4$)$_2$), LiCF$_3$SO$_3$, LiTFSI (LiN(SO$_2$CF$_3$)$_2$), LiFSI (LiN(SO$_2$F)$_2$), or LiBETI (LiN (SO$_2$CF$_2$CF$_3$)$_2$), or a mixture of two or more thereof, and more specifically, may include LiPF$_6$.

The content of the lithium salt may be appropriately changed within a typical range in which a lithium salt may be used, but in order to obtain an optimum effect of forming an anti-corrosive film on the surface of an electrode, the lithium salt may be included in the electrolyte solution at a concentration of 0.8 M to 3.0 M, specifically 1.0 M to 3.0 M. At this time, the unit "M" is a molar concentration, and may specifically mean "mol/L."

When the concentration of the lithium salt satisfies the above range, the viscosity of the non-aqueous electrolyte solution may be controlled to implement optimal impregnation, and the mobility of lithium ions may be improved to obtain an effect of improving the capacity properties and cycle properties of a lithium secondary battery.

2) Organic Solvent

The organic solvent may include a cyclic carbonate-based solvent and a linear carbonate-based solvent. The organic solvent may be composed of a cyclic carbonate-based solvent and a linear carbonate-based solvent.

The volume ratio of the cyclic carbonate-based solvent and the linear carbonate-based solvent may be 10:90 to 50:50, specifically 15:85 to 50:50, and more specifically 20:80 to 35:65, and when in the above range, it is preferable in terms of achieving high ion transfer properties and low electrolyte viscosity.

The cyclic carbonate-based solvent includes ethylene carbonate. The ethylene carbonate is a high-viscosity organic solvent having a high dielectric constant, and thus, may dissociate a lithium salt well in an electrolyte.

The cyclic carbonate-based solvent may not include fluorinated cyclic carbonate such as fluoroethylene carbonate (FEC). Specifically, the cyclic carbonate-based solvent may be formed of only ethylene carbonate, and may not include another cyclic carbonate-based solvent such as propylene carbonate.

In addition, the linear carbonate-based solvent includes dimethyl carbonate. The dimethyl carbonate is an organic solvent having low viscosity and a low dielectric constant, and particularly, is very excellent in electrolyte impregnation properties, and thus, may impregnate the high-loading positive electrode including lithium iron phosphate particles according to the present disclosure at an excellent level. Meanwhile, as an organic solvent, dimethyl carbonate has a problem of forming an unstable negative electrode film, which causes a problem of degrading the reduction stability of a negative electrode, but as to be described below, when dimethyl carbonate and vinylene carbonate are used at a specific content ratio, electrolyte impregnation properties and the reduction stability of a negative electrode may be simultaneously improved. In addition, the non-aqueous electrolyte of the present disclosure may implement a desired effect, especially when the loading amount of a positive electrode including lithium iron phosphate particles is 450 mg/25 cm$^2$ or greater, more specifically 450 mg/25 cm$^2$ to 740 mg/25 cm$^2$, and if the loading amount of a positive electrode is less than 450 mg/25 cm$^2$, it is not possible to obtain the effect of improving electrolyte impregnation properties according to the use of dimethyl carbonate.

The dimethyl carbonate is included in 5 vol % to 75 vol % in the organic solvent. In one embodiment, the dimethyl carbonate may be included in 5 vol % to 55 vol %, more specifically in 7 vol % to 45 vol %, and even more specifically in 35 vol % to 45 vol % in the organic solvent. If dimethyl carbonate is included in less than 5 vol % in the organic solvent, it is not possible to improve the impregnation properties of the positive electrode with respect to the electrolyte. If dimethyl carbonate is included in greater than 75 vol % in the organic solvent, it is not preferable in that an unstable SEI film is formed, and the cell performance is degraded.

The linear carbonate-based solvent may further include ethylmethyl carbonate together with the dimethyl carbonate. When the linear carbonate further includes ethylmethyl carbonate, it is preferable in that the stability of the SEI film may be further improved.

When the linear carbonate-based solvent further includes ethylmethyl carbonate, the organic solvent may include 10 vol % to 50 vol % of the ethylene carbonate, 5 vol % to 55 vol % of the dimethyl carbonate, and 20 vol % to 70 vol % of the ethylmethyl carbonate, more specifically, 20 vol % to 40 vol % of the ethylene carbonate, 7 vol % to 45 vol % of the dimethyl carbonate, and 25 vol % to 65 vol % of the ethylmethyl carbonate, and even more specifically, 25 vol % to 35 vol % of the ethylene carbonate, 30 vol % to 45 vol % of the dimethyl carbonate, and 25 vol % to 50 vol % of the ethylmethyl carbonate, or 30 vol % to 35 vol % of the ethylene carbonate, 35 vol % to 45 vol % of the dimethyl carbonate, and 25 vol % to 50 vol % of the ethylmethyl carbonate. When in the above range, it is preferable in terms of improving electrolyte impregnation properties and improving the stability of a negative electrode SEI film.

Meanwhile, if necessary, the organic solvent may additionally use any organic solvent commonly used in a non-aqueous electrolyte without limitation. For example, at least one organic solvent among an ester-based solvent, an ether-based solvent, a glyme-based solvent, or a nitrile-based solvent may be additionally included.

The ester-based solvent may include at least one of methyl acetate, ethyl acetate, propyl acetate, butyl acetate, methyl propionate, ethyl propionate, propyl propionate and butyl propionate, γ-butyrolactone, γ-valerolactone, γ-caprolactone, σ-valerolactone, or ε-caprolactone.

As the ether-based solvent, any one selected from the group consisting of dimethyl ether, diethyl ether, dipropyl ether, methyl ethyl ether, methyl propyl ether, ethyl propyl ether, 1,3-dioxolane (DOL), and 2,2-bis (trifluoromethyl)-1,3-dioxolane (TFDOL), or a mixture of two or more thereof may be used, but the present invention is not limited thereto.

The glyme-based solvent is a solvent having a higher dielectric constant and lower surface tension than those of a linear carbonate-based solvent, and having less reactivity with a metal, and may include at least one of dimethoxyethane (glyme, DME), diethoxyethane, digylme, tri-glyme, or tetra-glyme (TEGDME), but is not limited thereto.

The nitrile-based solvent may be one or more selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but is not limited thereto.

Meanwhile, the remainder of the non-aqueous electrolyte except for the lithium salt and the additive may all be the organic solvent unless otherwise stated.

(3) Additive

The non-aqueous additive of the present disclosure includes an additive.

The additive includes vinylene carbonate.

The vinylene carbonate may be used as an additive of the non-aqueous electrolyte of the present disclosure in terms of forming a stable SEI film on the negative electrode. Particularly, when dimethyl carbonate is used as an organic solvent, there is a problem in that the stability of the negative electrode SEI film is deteriorated when exposed to high temperatures, but by using vinylene carbonate as an additive, it is possible to improve negative electrode reduction stability.

In the present disclosure, the ratio of the weight of the vinylene carbonate to the weight of the dimethyl carbonate is greater than 0 to 0.2 or less. If the ratio of the weight of the vinylene carbonate to the weight of the dimethyl carbonate is greater than 0.2, the negative electrode SEI film is excessively formed, which may cause problems such as an increase in resistance and degradation in lifespan performance.

Specifically, the ratio of the weight of the vinylene carbonate to the weight of the dimethyl carbonate may be 0.01 to 0.18, more specifically 0.016 to 0.130, and even more specifically 0.02 to 0.08, and when in the above range, an effect of simultaneously improving the electrolyte impregnation properties of a positive electrode and the reduction stability of a negative electrode may be preferably implemented.

The ratio of the weight of the vinylene carbonate to the weight of the dimethyl carbonate may be calculated through the weight or volume of the entire non-aqueous electrolyte, the volume content, weight content, density information, and the like of the dimethyl carbonate.

The vinylene carbonate may be included in the non-aqueous electrolyte in an amount of 0.01 wt % to 7 wt %, specifically 0.3 wt % to 6 wt %, more specifically 0.4 wt % to 3 wt %, and even more specifically 0.6 wt % to 2 wt %, and when in the above range, it is preferable in that the negative electrode SEI film is properly formed to prevent electrolyte side reactions, and an increase in resistance due to the excessive use of additives is prevented.

Meanwhile, the additive may further include, if necessary, another additional additive in addition to vinylene carbonate to prevent the non-aqueous electrolyte solution from being decomposed in a high-output environment and causing a negative electrode to collapse, or to further improve low-temperature high-rate discharge properties, high-temperature stability, overcharge prevention, the effect of suppressing battery expansion at high temperatures, and the like.

Examples of the additional additive may include at least one of a cyclic carbonate-based compound, a halogen-substituted carbonate-based compound, a sultone-based compound, a sulfonate-based compound, a sulfate-based compound, a phosphate-based or phosphite-based compound, a borate-based compound, a nitrile-based compound, a benzene-based compound, an amine-based compound, a silane-based compound, or a lithium salt-based compound.

The cyclic carbonate-based compound may be, for example, vinylethylene carbonate, or the like.

The halogen-substituted carbonate-based compound may be, for example, fluoroethylene carbonate (FEC) and the like.

The sultone-based compound may be, for example, at least one compound selected from the group consisting of 1,3-propane sultone (PS), 1,4-butane sultone, ethene sulfone, 1,3-propene sultone (PRS), 1,4-butene sultone, and 1-methyl-1,3-propene sultone.

The sulfonate-based compound may contain a saturated hydrocarbon or an unsaturated hydrocarbon such as an alkenylene or an alkynylene group.

The sulfate-based compound may be, for example, ethylene sulfate (ESA), trimethylene sulfate (TMS), methyl trimethylene sulfate (MTMS), or the like.

The phosphate-based or phosphite-based compound may be, for example, one or more compounds selected from the group consisting of lithium difluoro(bisoxalato)phosphate, lithium difluorophosphate, tris(trimethylsilyl)phosphate, tris (trimethylsilyl)phosphite, tris(2,2,2-trifluoroethyl)phosphate, and tris(trifluoroethyl)phosphite.

The borate-based compound may be tetraphenylborate, lithium difluoro(oxalato)borate (LiODFB), lithium bisoxalatoborate (LiB($C_2O_4$)$_2$, LiBOB), or the like.

The nitrile-based compound may be, for example, at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may be, for example, fluorobenzene or the like, the amine-based compound may be triethanolamine, ethylenediamine, or the like, and the silane-based compound may be tetravinylsilane or the like.

The lithium salt-based compound is a compound different from the lithium salt included in the non-aqueous electrolyte solution, and may be lithium difluorophosphate ($LiPO_2F_2$), $LiBF_4$, or the like.

The additional additive may be used in combination of two or more compounds, and the total content of vinylene carbonate above and the additional additive may be 0.05 wt % to 20 wt %, more specifically 0.05 wt % to 10 wt %, based on the total weight of the non-aqueous electrolyte. When the total content of the additives satisfies the above range, it is possible to further effectively improve high-temperature storage properties and high-temperature lifespan properties, and prevent side reactions of the battery caused by additives remaining after a reaction.

The non-aqueous electrolyte may be manufactured by preparing an organic solvent by mixing ethylene carbonate (EC), dimethyl carbonate (DMC), and optionally ethylmethyl carbonate (EMC) in an amount as described above, particularly, wherein the dimethyl carbonate (DMC) is included in 5 vol % to 75 vol %, more specifically 5 vol % to 55 vol %, 7 vol % to 45 vol %, or 35 vol % to 45 vol % in the organic solvent. Then, a lithium salt as described above is dissolved in the organic solvent to have a concentration of 0.8 M to 3.0 M, specifically 1.0 M to 3.0 M. Next, vinylene carbonate (VC) is added to the organic solvent in which the lithium salt has been dissolved, wherein the vinylene carbonate (VC) is included in an amount of 0.01 wt % to 7 wt %, specifically 0.3 wt % to 6 wt %, more specifically 0.4 wt % to 3 wt %, and even more specifically 0.6 wt % to 2 wt %, with respect to a weight of the non-aqueous electrolyte, and a weight ratio of the vinylene carbonate to the dimethyl carbonate is greater than 0 to 0.2 or less, specifically 0.01 to 0.18, more specifically 0.016 to 0.130, and even more specifically 0.02 to 0.08. Additional solvents and/or additives described above may be included in the non-aqueous electrolyte.

The lithium secondary battery according to the present disclosure as described above may be usefully used in portable devices such as mobile phones, laptop computers, and digital cameras, in electric cars such as a hybrid electric vehicle (HEV), and the like.

Accordingly, according to another embodiment of the present invention, a battery module including the lithium secondary battery as a unit cell, and a battery pack including the battery module are provided.

The battery module or the battery pack may be used as a power source of one or more medium-and-large-sized devices such as a power tool, an electric car including an electric vehicle (EV), a hybrid electric vehicle (HEV), and a plug-in hybrid electric vehicle (PHEV), or a power storage system.

The external shape of the lithium secondary battery of the present disclosure is not particularly limited, but may be have a cylindrical shape using a can, a square shape, a pouch shape, a coin shape, or the like.

The lithium secondary battery according to the present disclosure may be used in a battery cell which is used as a power source for a small-sized device, and may also be preferably used as a unit cell for a medium- and large-sized battery module including a plurality of battery cells.

Hereinafter, the present invention will be described in detail with reference to examples.

At this time, the examples according to the present invention may be modified into other various forms, and the scope of the present invention should not be construed as being limited to the examples described below. The examples of the present invention are provided to describe the present invention more fully to those skilled in the art.

Hereinafter, the present invention will be described in detail with reference to specific examples.

EXAMPLES

Example 1

(Preparation of Non-Aqueous Electrolyte)

An organic solvent was prepared by mixing ethylene carbonate (EC), ethylmethyl carbonate (EMC), and dimethyl carbonate (DMC) in a volume ratio of 30:30:40.

$LiPF_6$ as a lithium salt was dissolved in the organic solvent to a molar concentration of 1.0 M.

In addition, a non-aqueous electrolyte was prepared by adding vinylene carbonate (VC) to the organic solvent in which the lithium salt was dissolved. The vinylene carbonate was included at a content of 1 wt % in the non-aqueous electrolyte.

(Manufacturing of Secondary Battery)

Lithium iron phosphate ($LiFePO_4$) particles formed with a carbon coating layer as a positive electrode active material, carbon black as a conductive material, and polyvinylidene fluoride (PVdF) as a binder were added at a weight ratio of 94:3:3 to N-methyl-2-pyrrolidone (NMP) as a solvent to prepare a positive electrode slurry. The positive electrode slurry was coated and dried with a loading amount of 600 mg/25 cm² on a positive electrode current collector (an Al thin film) having a thickness of 15 μm, and then roll-pressed to manufacture a positive electrode (thickness of positive electrode active material: 220 μm). The average particle diameter ($D_{50}$) of the positive electrode active material was 1.1 μm, and the lithium iron phosphate ($LiFePO_4$) particles formed with the carbon coating layer were in the form of a primary particle.

Artificial graphite as a negative electrode active material, SBR-CMC as a binder, and carbon black as a conductive material were added at a weight ratio of 97:2:1 to water as a solvent to prepare a negative electrode slurry. The negative electrode slurry was coated and dried with a loading amount of 300 mg/25 cm² on a copper (Cu) thin film, which is a negative electrode current collector, having a thickness of 15 μm, and then roll-pressed to manufacture a negative electrode (thickness of negative electrode active material: 170 μm).

The positive electrode, a polyolefin-based porous separator, and the negative electrode were sequentially stacked to prepare an electrode assembly.

The assembled electrode assembly was accommodated in a battery case, and then the prepared non-aqueous electrolyte solution was injected thereto to manufacture a lithium secondary battery.

Example 2

A lithium secondary battery was manufactured in the same manner as in Example 1, except that a non-aqueous electrolyte was prepared by using a mixture in which ethylene carbonate (EC), ethylmethyl carbonate (EMC), and dimethyl carbonate (DMC) were mixed at a volume ratio of 30:60:10 as an organic solvent.

Example 3

A lithium secondary battery was manufactured in the same manner as in Example 1, except that a non-aqueous electrolyte was prepared by using a mixture in which ethylene carbonate (EC) and dimethyl carbonate (DMC) were mixed at a volume ratio of 30:70 as an organic solvent.

Example 4

A lithium secondary battery was manufactured in the same manner as in Example 1, except that a non-aqueous electrolyte was prepared by adding 0.5 wt %, instead of 1 wt %, of vinylene carbonate as an additive to the non-aqueous electrolyte.

Example 5

A lithium secondary battery was manufactured in the same manner as in Example 1, except that a non-aqueous electrolyte was prepared by adding 5 wt %, instead of 1 wt %, of vinylene carbonate as an additive to the non-aqueous electrolyte.

Example 6

A lithium secondary battery was manufactured in the same manner as in Example 1, except that a positive electrode was manufactured by changing the loading amount of the positive electrode slurry from 600 mg/25 cm$^2$ to 500 mg/25 cm$^2$.

Example 7

A lithium secondary battery was manufactured in the same manner as in Example 1, except that a positive electrode was manufactured by changing the loading amount of the positive electrode slurry from 600 mg/25 cm$^2$ to 700 mg/25 cm$^2$.

Example 8

A lithium secondary battery was manufactured in the same manner as in Example 1, except that a positive electrode was manufactured by changing the loading amount of the positive electrode slurry from 600 mg/25 cm$^2$ to 450 mg/25 cm$^2$.

Comparative Example 1

A lithium secondary battery was manufactured in the same manner as in Example 1, except that a non-aqueous electrolyte was prepared by using a mixture in which ethylene carbonate (EC) and ethylmethyl carbonate (EMC) were mixed at a volume ratio of 30:70 as an organic solvent.

Comparative Example 2

A lithium secondary battery was manufactured in the same manner as in Example 1, except that a non-aqueous electrolyte was prepared by not adding vinylene carbonate as an additive.

Comparative Example 3

A lithium secondary battery was manufactured in the same manner as in Example 1, except that a non-aqueous electrolyte was prepared by adding 8 wt %, instead of 1 wt %, of vinylene carbonate as an additive to the non-aqueous electrolyte.

Comparative Example 4

A lithium secondary battery was manufactured in the same manner as in Example 6, except that a non-aqueous electrolyte was prepared by using a mixture in which ethylene carbonate (EC) and ethylmethyl carbonate (EMC) were mixed at a volume ratio of 30:70 as an organic solvent.

Comparative Example 5

A lithium secondary battery was manufactured in the same manner as in Example 1, except that a non-aqueous electrolyte was prepared by using a mixture in which ethylene carbonate (EC), ethylmethyl carbonate (EMC) and diethyl carbonate (DEC) were mixed at a volume ratio of 30:30:40 as an organic solvent, and that a positive electrode was manufactured by changing the loading amount of the positive electrode slurry from 600 mg/25 cm$^2$ to 500 mg/25 cm$^2$.

Comparative Example 6

A lithium secondary battery was manufactured in the same manner as in Example 1, except that a positive electrode was manufactured by changing the loading amount of the positive electrode slurry from 600 mg/25 cm$^2$ to 750 mg/25 cm$^2$.

Comparative Example 7

A lithium secondary battery was manufactured in the same manner as in Example 1, except that a non-aqueous electrolyte was prepared by using a mixture in which ethylene carbonate (EC) and ethylmethyl carbonate (EMC) were mixed at a volume ratio of 30:70 as an organic solvent, and that a positive electrode was manufactured by changing the loading amount of the positive electrode slurry from 600 mg/25 cm$^2$ to 400 mg/25 cm$^2$.

Comparative Example 8

A lithium secondary battery was manufactured in the same manner as in Example 1, except that a positive electrode was manufactured by changing the loading amount of the positive electrode slurry from 600 mg/25 cm$^2$ to 400 mg/25 cm$^2$.

Comparative Example 9

A lithium secondary battery was manufactured in the same manner as in Example 1, except that a non-aqueous electrolyte was prepared by using a mixture in which ethylene carbonate (EC), ethylmethyl carbonate (EMC) and diethyl carbonate (DEC) were mixed at a volume ratio of 30:30:40 as an organic solvent, and that a positive electrode was manufactured by changing the loading amount of the positive electrode slurry from 600 mg/25 cm$^2$ to 400 mg/25 cm$^2$.

TABLE 1

| Positive | Non-aqueous electrolyte | | | | | | |
| electrode loading amount | Organic solvent | | | | Lithium salt | Additive | VC/DMC or VC/DEC |
| (mg/25 cm$^2$) | EC (vol %) | EMC (vol %) | DMC (vol %) | DEC (vol %) | LiPF$_6$ (mol/L) | VC (wt %) | weight ratio |
|---|---|---|---|---|---|---|---|
| Example 1 | 600 | 30 | 30 | 40 | — | 1 | 1 | 0.030 |
| Example 2 | 600 | 30 | 60 | 10 | — | 1 | 1 | 0.120 |
| Example 3 | 600 | 30 | — | 70 | — | 1 | 1 | 0.018 |
| Example 4 | 600 | 30 | 30 | 40 | — | 1 | 0.5 | 0.015 |
| Example 5 | 600 | 30 | 30 | 40 | — | 1 | 5 | 0.159 |
| Example 6 | 500 | 30 | 30 | 40 | — | 1 | 1 | 0.030 |
| Example 7 | 700 | 30 | 30 | 40 | — | 1 | 1 | 0.030 |
| Example 8 | 450 | 30 | 30 | 40 | — | 1 | 1 | 0.030 |
| Comparative Example 1 | 600 | 30 | 70 | — | — | 1 | 1 | — |
| Comparative Example 2 | 600 | 30 | 30 | 40 | — | 1 | — | 0 |
| Comparative Example 3 | 600 | 30 | 30 | 40 | — | 1 | 8 | 0.263 |
| Comparative Example 4 | 500 | 30 | 70 | — | — | 1 | 1 | — |
| Comparative Example 5 | 500 | 30 | 30 | — | 40 | 1 | 1 | 0.030 |
| Comparative Example 6 | 750 | 30 | 30 | 40 | — | 1 | 1 | 0.030 |
| Comparative Example 7 | 400 | 30 | 70 | — | — | 1 | 1 | — |
| Comparative Example 8 | 400 | 30 | 30 | 40 | — | 1 | 1 | 0.030 |
| Comparative Example 9 | 400 | 30 | 30 | — | 40 | 1 | 1 | 0.030 |

Experimental Examples

Experimental Example 1: Initial Capacity Expression Rate Measurement

Initial charge/discharge was performed by charging the lithium secondary batteries of Examples 1 to 8 and Comparative Examples 1 to 9 manufactured above to 3.65 V under the conditions of CC/CV and 0.33 C at 25° C., and discharging the same to 2.5 V with 0.33 C to measure the initial discharge capacity (unit: mAh) thereof.

The initial discharge capacity was divided by the cell design capacity (based on 0.33 C), and then multiplied by 100 to evaluate the capacity expression rate (%). The results are shown in Table 2 below.

Experimental Example 2: Cycle Charge/Discharge Capacity Retention Rate Evaluation Charging the lithium secondary batteries of Examples 1 to 8 and Comparative Examples 1 to 9 manufactured above to 3.65 V under the conditions of CC/CV and 0.33 C at 25° C., and discharging the same to 2.5 V with 0.33 C was set to one cycle, and the discharge capacity and the resistance thereof after 1 cycle were measured. At this time, the resistance was measured using a voltage drop difference obtained by check-ing the capacity at room temperature, charging the batteries to SOC 50% based on the discharge capacity, and then discharging the batteries for 10 seconds with a current of 2.5 C.

Thereafter, 200 cycles of charge/discharge were performed under the above charge/discharge conditions, and then the capacity retention rate (%) and the resistance increase rate (%) were measured. The capacity retention rate (%) was calculated according to [Equation 1] below, and the resistance increase rate (%) was calculated according to [Equation 2] below. The measurement results are shown in Table 2 below.

$$\text{Capacity retention rate (\%)} = \text{(discharge capacity after 200 cycles/discharge capacity after 1 cycle)} \times 100 \qquad \text{[Equation 1]}$$

$$\text{Resistance increase rate (\%)} = \{\text{(resistance after 200 cycles} - \text{resistance after 1 cycle)}/\text{resistance after 1 cycle}\} \times 100 \qquad \text{[Equation 2]}$$

TABLE 2

| | Experimental Example 1 | | | Experimental Example 2 | |
| --- | --- | --- | --- | --- | --- |
| | Cell design capacity (mAh) | Initial discharge capacity (mAh) | Capacity expression rate (%) | Capacity retention rate (%, $200^{th}$ cycle) | Resistance increase rate (%, $200^{th}$ cycle) |
| Example 1 | 730 | 724 | 99.2 | 92.6 | 8.5 |
| Example 2 | 730 | 719 | 98.5 | 92.0 | 13.7 |
| Example 3 | 730 | 726 | 99.5 | 92.3 | 9.8 |
| Example 4 | 730 | 722 | 98.9 | 91.1 | 8.1 |
| Example 5 | 730 | 718 | 98.4 | 93.8 | 12.7 |
| Example 6 | 610 | 608 | 99.7 | 91.9 | 7.3 |
| Example 7 | 855 | 850 | 99.4 | 92.3 | 8.0 |
| Example 8 | 550 | 546 | 99.3 | 92.2 | 7.1 |
| Comparative Example 1 | 730 | 973 | 92.2 | 81.2 | 34.4 |
| Comparative Example 2 | 730 | 724 | 99.2 | 84.0 | 22.8 |
| Comparative Example 3 | 730 | 701 | 96.0 | 89.1 | 23.5 |
| Comparative Example 4 | 610 | 588 | 96.4 | 85.6 | 23.7 |
| Comparative Example 5 | 610 | 558 | 91.5 | 86.1 | 20.1 |
| Comparative Example 6 | 916 | 831 | 90.7 | 81.4 | 35.2 |
| Comparative Example 7 | 490 | 486 | 99.2 | 93.2 | 10.4 |
| Comparative Example 8 | 490 | 487 | 99.4 | 93.4 | 10.0 |
| Comparative Example 9 | 490 | 486 | 99.2 | 93.6 | 10.0 |

Referring to Table 2 above, it can be confirmed that the lithium secondary batteries of Examples 1 to 8 according to the present disclosure exhibit an excellent capacity expression effect, and excellent lifespan performance and a low resistance increase rate, compared to those of Comparative Examples 1 to 6.

In addition, Example 6 in which the positive electrode loading amount was designed to be 500 mg/25 cm$^2$ exhibits an excellent capacity expression effect, excellent lifespan performance, and a low resistance increase rate compared to that of Comparative Example 4 in which dimethyl carbonate was not used.

Meanwhile, referring to Comparative Examples 7 to 9 in which the positive electrode loading amount was designed at 400 mg/25 cm$^2$, the loading amount was adjusted low and electrolyte impregnation was not a major problem, so it can be seen that it was not significantly affected by the components and content of the non-aqueous electrolyte. Specifically, comparing Comparative Examples 7 and 8, it can be confirmed that even if dimethyl carbonate is used as an organic solvent component, the improvement in effect is insignificant in terms of capacity expression, lifetime performance, and resistance increase rate. In addition, Comparative Example 9, which used a linear carbonate other than dimethyl carbonate, showed the same or similar level of performance as Comparative Examples 7 and 8. As a result, it can be confirmed that the non-aqueous electrolyte according to the present disclosure expresses a particularly good effect in a specific loading amount (for example, more than 400 mg/25 cm$^2$ and less than 750 mg/25 cm$^2$, and more specifically, 450 mg/25 cm$^2$ to 740 mg/25 cm$^2$) of lithium iron phosphate-containing positive electrode.

The lithium secondary battery according to the present disclosure is characterized by including a positive electrode which has a specific loading amount or greater and includes lithium iron phosphate particles as a positive electrode active material, and a non-aqueous electrolyte which includes ethylene carbonate and dimethyl carbonate as an organic solvent, and includes vinylene carbonate as an additive, wherein the content and content ratio of each of the dimethyl carbonate and the vinylene carbonate are adjusted to be in a specific range. According to the lithium secondary battery of the present disclosure, excellent dimethyl carbonate is used as an organic solvent component to improve the electrolyte impregnation properties of a positive electrode having a high loading amount, and at the same time, vinylene carbonate additive is used to have a specific content ratio in relation to dimethyl carbonate to improve negative electrode reduction stability, so that the capacity of the lithium secondary battery may be expressed at an excellent level, and the lifespan performance and resistance properties may be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A lithium secondary battery comprising
a positive electrode, a negative electrode, a separator, and a non-aqueous electrolyte,
wherein:
the positive electrode comprises a positive electrode active material, wherein the positive electrode active material comprises lithium iron phosphate particles, and the positive electrode has a loading amount of 450 mg/25 cm$^2$ to 740 mg/25 cm$^2$; and
the non-aqueous electrolyte comprises a lithium salt, an organic solvent, and an additive,
wherein the organic solvent comprises a cyclic carbonate-based solvent and a linear carbonate-based solvent, wherein the cyclic carbonate-based solvent comprises ethylene carbonate, and the linear carbonate-based solvent comprises dimethyl carbonate and ethylmethyl carbonate,
wherein the organic solvent comprises 10 vol % to 35 vol % of ethylene carbonate, 5 vol % to 55 vol % of dimethyl carbonate, and 20 vol % to 70 vol % of ethylmethyl carbonate, and a volume ratio of the cyclic carbonate-based solvent to the linear carbonate-based solvent is from 10:90 to 35:65,
the additive comprises vinylene carbonate, and
a weight ratio of the vinylene carbonate to the dimethyl carbonate is greater than 0 to 0.2 or less.

2. The lithium secondary battery of claim 1, wherein the positive electrode has a loading amount of 600 mg/25 cm$^2$ to 740 mg/25 cm$^2$.

3. The lithium secondary battery of claim 1, wherein the positive electrode has a loading amount of 500 mg/25 cm$^2$ to 740 mg/25 cm$^2$.

4. The lithium secondary battery of claim 1, wherein the vinylene carbonate is included in 0.01 wt % to 7 wt % in the non-aqueous electrolyte.

5. A lithium secondary battery comprising a positive electrode, a negative electrode, a separator, and a non-aqueous electrolyte, wherein:
the positive electrode comprises a positive electrode active material, wherein the positive electrode active material comprises lithium iron phosphate particles, and the positive electrode has a loading amount of 450 mg/25 cm$^2$ to 740 mg/25 cm$^2$; and
the non-aqueous electrolyte comprises a lithium salt, an organic solvent, and an additive,
wherein the organic solvent comprises 10 vol % to 50 vol % of ethylene carbonate, 35 vol % to 55 vol % of dimethyl carbonate, and 20 vol % to less than 35 vol % of ethylmethyl carbonate,
the additive comprises vinylene carbonate, and
a weight ratio of the vinylene carbonate to the dimethyl carbonate is greater than 0 to 0.2 or less.

6. The lithium secondary battery of claim 1, wherein the lithium salt comprises at least one of LiCl, LiBr, LiI, LiBF$_4$, LiClO$_4$, LiAlO$_4$, LiAlCl$_4$, LiPF$_6$, LiSbF$_6$, LiAsF$_6$, LiB$_{10}$Cl$_{10}$, LiBOB (LiB(C$_2$O$_4$)$_2$), LiCF$_3$SO$_3$, LiTFSI (LiN(SO$_2$CF$_3$)$_2$), LiFSI (LiN(SO$_2$F)$_2$), LiCH$_3$SO$_3$, LiCF$_3$CO$_2$, LiCH$_3$CO$_2$, or LiBETI (LiN(SO$_2$CF$_2$CF$_3$)$_2$).

7. The lithium secondary battery of claim 1, wherein the lithium salt is included in 0.8 M to 3.0 M in the non-aqueous electrolyte.

8. The lithium secondary battery of claim 1, wherein the lithium iron phosphate particles comprise a compound represented by Formula A:

$$Li_{1+a}Fe_{1-s}M_s(PO_{4-b})X_b \qquad \text{[Formula A]}$$

wherein in Formula A, M is one or more elements selected from the group consisting of Co, Ni, Mn, Al, Mg, Ti, and V, and X is F, S, or N, wherein: $0 \leq s \leq 0.5$; $-0.5 \leq a \leq +0.5$; and $0 \leq b \leq 0.1$.

9. The lithium secondary battery of claim 1, wherein the lithium iron phosphate particles comprise LiFePO$_4$.

10. The lithium secondary battery of claim 1, wherein:
the lithium iron phosphate particles are in the form of a primary particle; and
the lithium iron phosphate particles have an average particle size (D$_{50}$) of 0.2 μm to 3.0 μm.

11. The lithium secondary battery of claim 1, wherein the lithium iron phosphate particles have a carbon coating layer on a surface.

12. The lithium secondary battery of claim 1, wherein the positive electrode active material does not comprise a lithium nickel-based oxide.

13. The lithium secondary battery of claim 1, wherein the negative electrode comprises a carbon-based active material.

14. The lithium secondary battery of claim 13, wherein the carbon-based active material comprises at least one of natural graphite or artificial graphite.

15. A method for preparing a lithium secondary battery, the method comprising:
preparing an electrode assembly comprising a positive electrode, a negative electrode, and a separator, wherein the positive electrode comprises a positive electrode active material comprising lithium iron phosphate particles, and the positive electrode has a loading amount of 450 mg/25 cm$^2$ to 740 mg/25 cm$^2$;

accommodating the electrode assembly in a battery case;

preparing a non-aqueous electrolyte comprising a lithium salt, an organic solvent, and an additive, wherein the organic solvent comprises a cyclic carbonate-based solvent and a linear carbonate-based solvent, wherein the cyclic carbonate-based solvent comprises ethylene carbonate, and the linear carbonate-based solvent comprises dimethyl carbonate and ethylmethyl carbonate, wherein the organic solvent comprises 10 vol % to 35 vol % of ethylene carbonate, 5 vol % to 55 vol % of dimethyl carbonate, and 20 vol % to 70 vol % of ethylmethyl carbonate, and a volume ratio of the cyclic carbonate-based solvent to the linear carbonate-based solvent is from 10:90 to 35:65, wherein the additive comprises vinylene carbonate, and wherein a weight ratio of the vinylene carbonate to the dimethyl carbonate is greater than 0 to 0.2 or less; and injecting or impregnating the non-aqueous electrolyte prepared into the battery case.

16. The lithium secondary battery of claim 5, wherein a volume ratio of the cyclic carbonate-based solvent to the linear carbonate-based solvent is 10:90 to 50:50.

17. The lithium secondary battery of claim 5, wherein the weight ratio of the vinylene carbonate to the dimethyl carbonate is greater than 0 to 0.130 or less.

18. The lithium secondary battery of claim 5, wherein the positive electrode has a loading amount of 600 mg/25 cm$^2$ to 740 mg/25 cm$^2$.

19. The lithium secondary battery of claim 5, wherein the positive electrode has a loading amount of 500 mg/25 cm$^2$ to 740 mg/25 cm$^2$.

* * * * *